United States Patent [19]
Boldt, Jr. et al.

[11] Patent Number: 5,328,597
[45] Date of Patent: Jul. 12, 1994

[54] ELECTRONIC MONITORING UNIT FOR MONITORING NUMBER OF USES OF CARTRIDGE

[75] Inventors: Norton K. Boldt, Jr., El Toro; Kaj A. Johnson, Livermore, both of Calif.

[73] Assignee: The Clorox Corporation, Oakland, Calif.

[21] Appl. No.: 920,413

[22] Filed: Jul. 27, 1992

[51] Int. Cl.$^5$ .............. B01D 35/143; B67D 5/22
[52] U.S. Cl. .............................. 210/87; 206/5.1; 210/282; 222/23; 222/36; 222/189; 222/544; 340/603; 116/264
[58] Field of Search ............... 210/85, 87, 94, 138, 210/282, 86, 143; 340/500, 603, 606, 609, 611; 379/136; 55/274; 222/23, 30, 544, 189, 36; 364/420, 550, 556, 569; 116/264; 206/5.1

[56] References Cited

U.S. PATENT DOCUMENTS

| | | | |
|---|---|---|---|
| 4,306,971 | 12/1981 | Hankammer | 210/282 |
| 4,431,533 | 2/1984 | Wrede | 210/87 |
| 4,436,223 | 3/1984 | Wilson | 222/36 |
| 4,469,602 | 9/1984 | Seal | 210/665 |
| 4,623,451 | 11/1986 | Oliver | 210/87 |
| 4,623,457 | 11/1986 | Hankammer | 210/237 |
| 4,681,677 | 7/1987 | Kuh et al. | 210/88 |
| 4,683,054 | 7/1987 | Turnbull | 210/91 |
| 4,711,368 | 12/1987 | Simons | 220/450 |
| 4,814,090 | 3/1989 | Kunz et al. | 210/662 |
| 4,830,757 | 5/1989 | Lynch et al. | 210/742 |
| 4,845,470 | 7/1989 | Boldt, Jr. | 340/540 |
| 4,849,098 | 7/1989 | Wilcock et al. | 210/88 |
| 4,851,818 | 7/1989 | Brown et al. | 340/603 |
| 4,895,648 | 1/1990 | Hankammer | 210/188 |
| 4,918,426 | 4/1990 | Butts et al. | 340/611 |
| 4,964,155 | 10/1990 | Pinard | 379/136 |
| 4,986,901 | 1/1991 | Nohren et al. | 210/282 |
| 5,089,144 | 2/1992 | Ozkahyaoglu et al. | 210/87 |
| 5,128,034 | 7/1992 | Kool | 210/282 |
| 5,190,643 | 3/1993 | Duncan et al. | 210/282 |
| 5,255,819 | 10/1993 | Peckels | 222/36 |

FOREIGN PATENT DOCUMENTS

| | | | |
|---|---|---|---|
| 3736517 | 11/1988 | Fed. Rep. of Germany | 210/282 |
| 3538197 | 3/1989 | Fed. Rep. of Germany | 210/282 |
| 3612714 | 10/1989 | Fed. Rep. of Germany | 210/282 |
| 63-147514 | 6/1988 | Japan | 55/274 |

*Primary Examiner*—Joseph W. Drodge
*Attorney, Agent, or Firm*—Harold L. Jackson

[57] ABSTRACT

A self-contained electronic monitoring unit for attachment to a device, such as a water filter, designed to be used until the occurrence of a predetermined event such as a predetermined number of uses, includes transducer for providing distinct outputs such as different audio output signals. A programmed integrated circuit and use detecting means such as electrical contacts detect each use of the device and monitor when the device is operational, when the end of life event is imminent and has occurred. The integrated circuit is programmed to operate the transducer to produce output signals during each use of the device informing the user that the device is operational, that the predetermined event or end of useful life is imminent and that the useful life has expired. The unit includes a battery for supplying power to the transducer and integrated circuit.

30 Claims, 6 Drawing Sheets

ELECTRONIC MONITORING UNIT FOR MONITORING NUMBER OF USES OF CARTRIDGE

BACKGROUND OF THE INVENTION

1. Field of the Invention

The present invention relates to electronic units for monitoring the useful life of devices designed for limited use such as water filters, for example, and more particularly to such units which provide signals informing the user of the current status of the device.

2. Description of the Prior Art

Many devices, such as disposable household water filtration cartridges, are designed for a limited useful life based on a number of discrete uses or elapsed time of use and perhaps additional factors such as flow rate, output water quantity, etc. Such cartridges are generally designed to filter a given quantity of water e.g., a certain number of fills of a specified container. However, there is no practical way for a consumer to manually keep track of the total number of container fills to determine when the filter cartridge is used up so that it may be replaced with a new cartridge. As a result most consumers will continue to use the filter until the water quality has degraded to the point of offending his or her sense of taste or smell. By that time the filter apparatus itself, rather than the used up cartridge, may be blamed for the poor water quality.

There have been several attempts to solve the problem of water filter cartridge overuse. U.S. Pat. No. 4,431,533 discloses a water filter in which water flowing through the cartridge completes an electric circuit between a battery and a visual or audio annunciator. Battery lifetime is selected so that the battery will run down and ceases to energize the annunciator when the filter cartridge is used up. However, the life of a battery will vary with factors in addition to the operating time of the filter such as temperature, non-operating time, etc. In addition, the indicator of the '533 patent does not inform the consumer when the end of the useful life of the cartridge is imminent so that a replacement cartridge can be obtained if not already on hand. Present devices require user participation and are prone to neglect if not used correctly.

U.S. Pat. No. 4,623,451 describes a home sink mounted water purification system which incorporates a purity sensing circuit including a pair of electrodes inserted in the filtered water for measuring current flow and/or a flow meter coupled to a timer for indicating the total quantity of filtered water. Visual indicators inform the operator that the water has acceptable levels of purity or that the apparatus should be serviced as a result of (a) the water purity falling below a preset level or (b) a predetermined quantity of water having been dispensed.

The '451 circuit dependent upon the incoming water quality is somewhat complex, does not count the number of uses of the cartridge and like the '533 device does not signal the consumer that the end of the cartridge life is imminent.

U.S. Pat. No. 4,683,054 discloses a tabletop water purifier which measures the time that the filter element is operational and also measures the efficiency of the filter element in removing dissolved solids. When the operational time reaches a predetermined amount or when the filter element efficiency drops below a preset value the operator is informed via a light signal of a potential requirement for change of the element i.e., end of its useful life.

U.S. Pat. No. 4,681,677 discloses a water filter apparatus which utilizes water pressure sensors to measure the pressure drop across a filter element and to activate a water shutoff valve upon reaching a preselected differential pressure.

U.S. Pat. No. 4,849,098 discloses an automatic water quality monitor for installation between a water filter and a conventional drinking water faucet. The monitor measures the total dissolved solids ("TDS") in the filter output and intermittently energizes a green light emitting diode ("LED") as long as the TDS is below a given value and energizes a red LED if that level is exceeded.

In addition to water filter elements, there are many other devices designed for use until a predetermined event has occurred such as (1) the last use of a given number of uses or (2) the expiration of a predetermined period of time or (3) the passage of a preset volume of material etc. There is a need for a small compact monitoring unit which may be fitted to such devices to inform the consumer or operator of the status of the device and particularly of the imminent end and the end of the useful life thereof.

SUMMARY OF THE INVENTION

In accordance with the present invention an electronic status monitoring unit is adapted to be secured to or fitted to a device designed to be used until the occurrence of a predetermined event such as a specified number of uses, etc. The monitoring unit includes means for monitoring the occurrence, the imminent occurrence and the non-imminent occurrence of the predetermined event and for informing the user that the predetermined event has occurred, is imminent and non-imminent. The term non-imminent as used herein means that the device is operational and that the event is sufficiently remote so that the user need not be concerned about additional uses of the device. The term imminent as used herein means that the device is still operational but that the event is about to occur and that the user should be concerned about replacing the device.

Signaling means are included in the unit for providing at least first and second human detectable output signals. The unit further includes a programmed integrated circuit or microprocessor portion responsive to the predetermined event monitoring means for selectively operating the signaling means.

The integrated circuit portion is preferably programmed so that (1) when the output of the predetermined event monitoring means is indicative of the non-imminent occurrence of the predetermined event, the signaling means is operated to provide the first output signal, (2) when the output of the predetermined event monitoring means is indicative of the imminent occurrence of the predetermined event, the signaling means is operated to provide the second output signal and (3) when the output of the predetermined event monitoring means is indicative of the past occurrence of the predetermined event, the signaling means is operated to provide neither the first or second signals output signals to thereby inform the user that the useful life of the device has ended.

The features of the present invention can best be understood by reference to the following description taken in conjunction with the accompanying drawings in which like reference numerals indicate like components.

DESCRIPTION OF THE PREFERRED EMBODIMENTS

Referring now to the drawings and particularly to FIGS. 1-5, there is illustrated a water treatment or purifier apparatus which includes a container or vessel in the form of a pitcher 10, the bottom end of which is not shown. The pitcher 10 is provided with a handle 12, a pouring spout 14 at the front thereof, an upwardly opening funnel 16 forming the top of the pitcher and a downwardly open sleeve 18 having aperture (not shown) in the bottom end through which water passes from the funnel to the interior of the pitcher.

Figure 1:
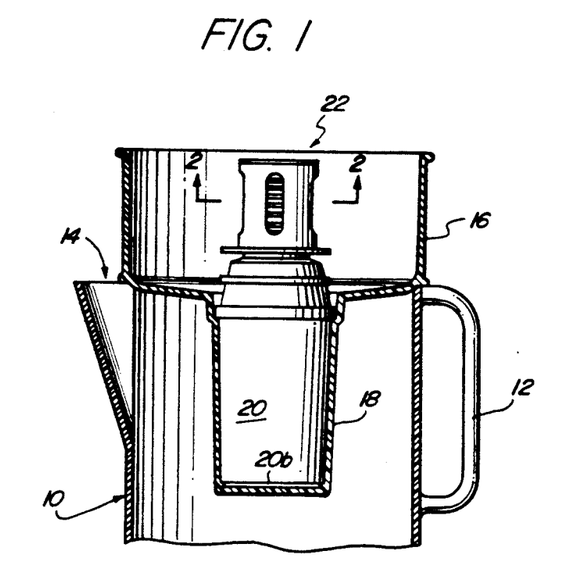
FIG. 1 is a side elevational view, partially in cross section, of a water filter apparatus including a disposable filter element or cartridge and an electronic useful life monitoring unit in accordance with the present invention attached thereto.
Figure 2:
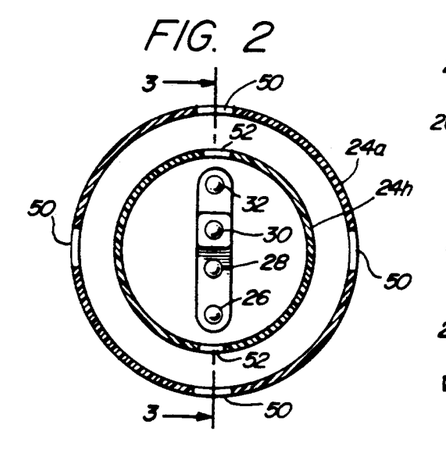
FIG. 2 is an enlarged bottom view taken along lines 2—2.

A disposable water filter element or cartridge 20 is positioned in the downwardly open sleeve 18 so that the filter cover 20a extends above the bottom of the funnel 16 and the filter bottom terminates adjacent the lower end of the sleeve 18 as shown. The filter cover 20a and bottom 20b are provided with filter slots (not shown) so that water poured into the funnel 16 flows through the cartridge and the filtering agents therein and collects in the pitcher as processed or filtered water. A more detailed description of this type of water filter apparatus is provided in U.S. Pat. Nos. 4,895,648 and 4,623,457.

Figure 3:
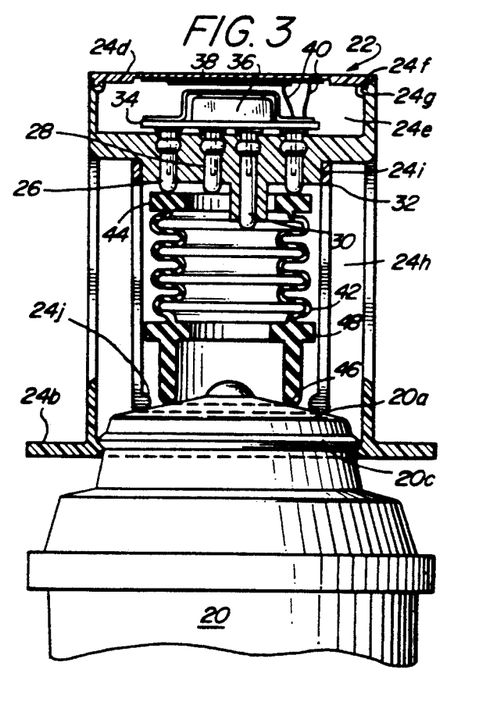
FIG. 3 is a cross-sectional view taken along lines 2—2 of FIG. 1.
Figure 4:
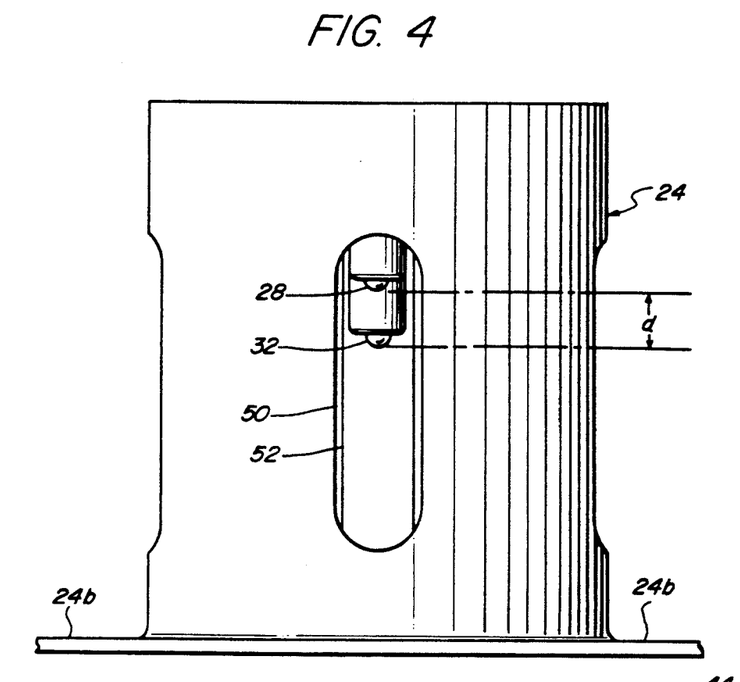
FIG. 4 is a side elevational view of the monitoring unit of FIG. 1.

An electronic monitoring unit 22 in accordance with this invention is secured to the top of the filter cartridge and extends over the cover 20a thereof. The monitoring unit includes certain electronic components contained within a housing 24. The housing includes an outer sleeve 24a which terminates in a flange 24b at its lower end. A cylindrical shelf 24c is formed integrally with the sleeve and extends below the top of the sleeve. A cap 24d is suitably secured, e.g. by ultrasonic bonding, hot plate welding or other conventional bonding, across the top of the sleeve to form a watertight chamber or cavity 24e within which a battery, piezo electric transducer (signal generator) and an integrated circuit or microprocessor (to be described) are housed. The cap 24d is provided with an annular boss 24f which mates with a groove 24g in the top of the sleeve 24a for accurate alignment of the cap and sleeve. An inner sleeve 24h is secured over a downwardly extending shoulder 24i on the shelf 24c. The inner sleeve terminates in an inwardly projecting flange 24j which abuts the filter cover 20a when the housing 24 is in place on the filter cartridge. The outer sleeve 24a terminates at its lower end in an inwardly projecting ridge 24k and snaps over an outwardly projecting rib 20c at the base of the cartridge cover 20a as illustrated in FIG. 3 to releasably secure the housing 24 to the filter cartridge 20. The housing may be molded from a suitable electrically insulating plastic material which is sufficiently flexible to provide the necessary resilience to allow the lower end of the outer sleeve to snap over the ridge 20c.

Four contacts 26, 28, 30 and 32 extend through the shelf 24c and are connected at one end to a printed circuit board 34 disposed within the cavity 24c. The contact 32 may conventionally be connected to a common ground for the electrical components. A battery 36 having a suitable output voltage of say 1.5v, for example, and an integrated circuit (not shown in FIG. 3) are mounted on the top of the printed circuit board 34. A piezo electric transducer 38 is mounted on the underside of the cap 24d so that the cap and echo chamber 24e serve to amplify the sound generated by the transducer. Leads 40 connect the transducer to the integrated circuit.

An elastomeric hollow accordion style sleeve 42 carries an electrically conducting ring 44 (which may be of the same material as the sleeve 42) at the top thereof for shortening contacts 26 and 32 when the monitoring unit is secured to a filter cartridge and the bottom 46 of the sleeve engages the filter cover as is illustrated in FIG. 3.

When the monitoring unit is separated from a filter cartridge and held in and upright position, the sleeve 42 drops by force of gravity until a flange 48 thereon engages the inner sleeve shoulder 24j. In this position there is an open circuit between contacts 28 and 32.

The outer (24a) and inner (24h) sleeves of the housing are provided with elongated openings 50 and 52, respectively through which water flows from the funnel to the interior of the housing and completes a circuit between contacts 28 and/or 30 and the ground electrode 32 as will be explained.

The monitoring unit 22 may be designed for use with one or more cartridges and each cartridge may be designed for use X number of times, i.e., for a given number of fills of the pitcher. As an example, the monitoring unit 22 is designed for use with three separate filter cartridges and each cartridge is designed to filter the water for a maximum of X or 101 fill ups of the container. The monitoring unit provides three distinct human detectable audio signals to (a) apprise the user of the 101st fill up (occurrence of the predetermined event or the end of life warning stage), (b) warn the user that the cartridge is on its last 10 fill ups (imminent occurrence of the predetermined event of anticipatory end of life warning stage) and (c) apprise the user that the cartridge is in its operational stage or the end of the useful life of the cartridge is not imminent (fill ups 1–89). After the predetermined number of uses (101) has occurred or post end of life stage, the monitoring unit is designed to provide no output signal thereby informing the user that the useful life of the filter has ended. In addition, the monitoring unit may optionally measure the time required for each individual or several consecutive fill ups and apprise the user that the end of the useful life of the cartridge has occurred when the flow rate through the cartridge exceeds a given amount signifying an unacceptable degradation of the cartridge.

Figures 5, 6:
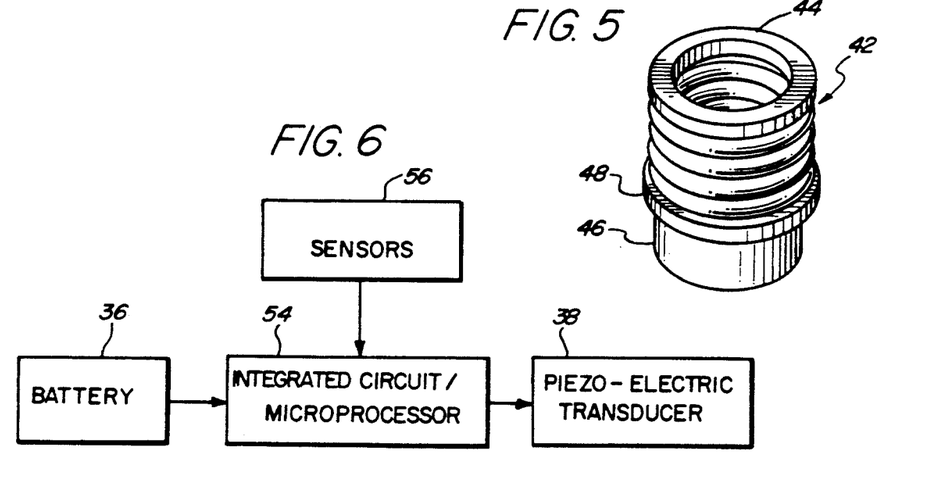
FIG. 5 is a perspective view of the sleeve which shorts the filter application sense contacts of the monitoring unit.
FIG. 6 is a block diagram of the monitoring unit of FIG. 1.

The components of the monitoring unit are illustrated in block form in FIG. 6 in which a programmable integrated circuit or microprocessor 54 receives inputs from sensors 65 i.e., the contacts 28–32, and actuates the piezo-electric transducer 38 to produce the signals discussed above. The battery 36 is connected to integrated circuit 54 in phases as will be explained in reference to FIG. 7. The integrated circuit includes an appropriate memory (volatile or non-volatile) for storing the program and the signals necessary for determining the stage in which the filter is operating.

Figure 7:
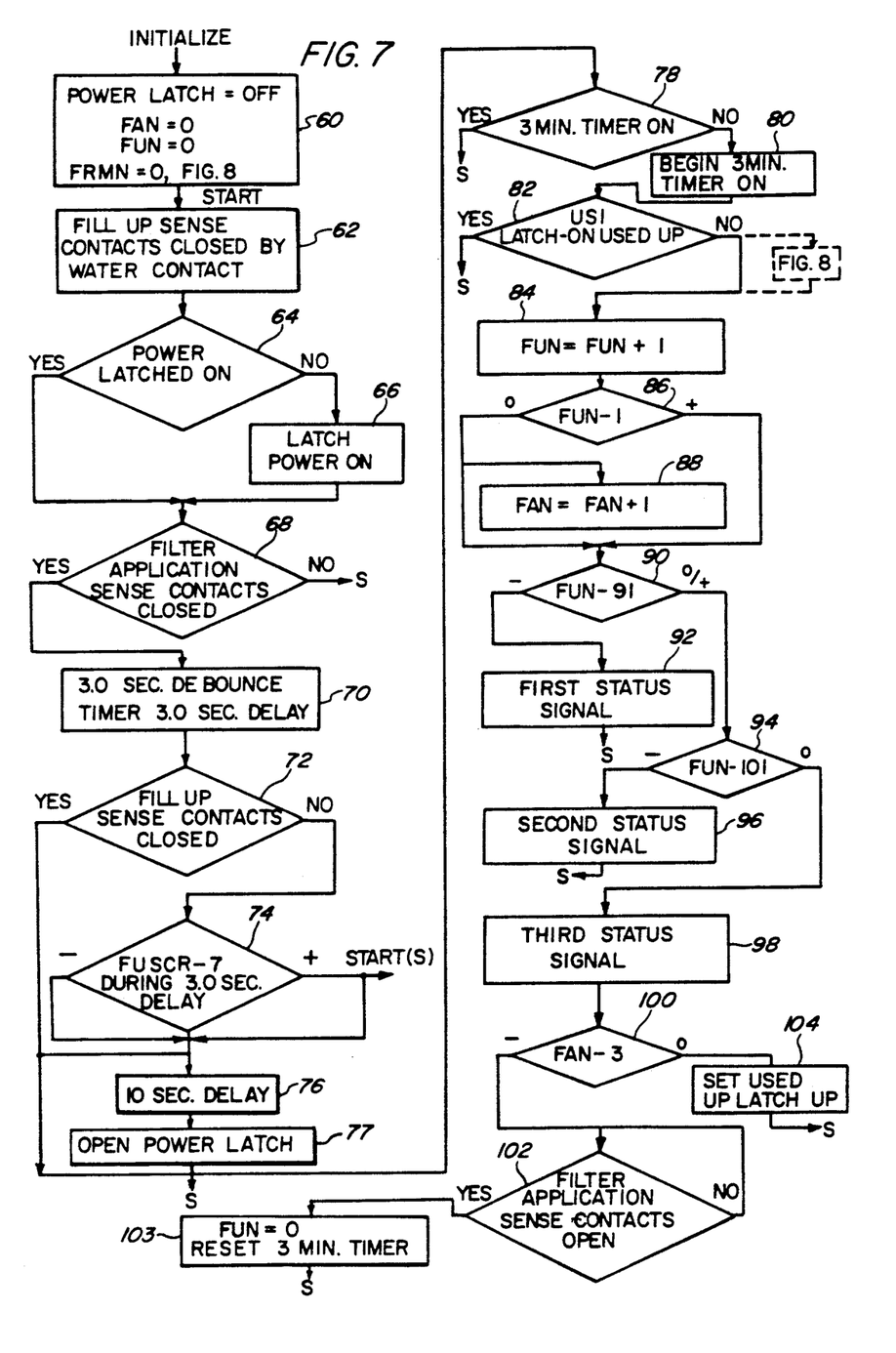
FIG. 7 illustrates, in flow chart form, the program executed by the microprocessor or integrated circuit of the monitoring unit.

Referring now to FIG. 7 which illustrates in flow chart form, the program executed by the integrated circuit/microprocessor 54 of FIG. 6, the circuit is initialized (step 60) and power applied to a small portion of the circuit to which the fill sense contacts 28 and 32 are connected. A power latch, which may be in the form of circuit transistors, is in the off condition to conserve power and optimize the shelf life of the battery. At this time, a filter application number (FAN) counter which keeps track of the number of filter cartridges which have been used with the monitoring unit is set to zero. A fill up number (FUN) counter which keeps track of the number of times that a particular cartridge has been used with the monitoring unit is also set to zero. Additional counters and registers, to be described, are also set at zero. If the unit is optionally designed to measure and compare the initial and subsequent flow rates, as will be explained in conjunction with FIG. 8, an additional flow rate monitor number ("FRMN") counter is also set to zero during the initializing step.

The monitoring unit is now ready to be applied to a cartridge or tested. Following initialization, the program commences when the fill up sense contacts 28 and 32 are closed during the initial use of the filter cartridge, to which the unit has been affixed, by water contact (or during a test sequence) as illustrated in step 62. Power is then latched on to the remainder of the integrated circuit (unless previously latched on) via steps 64 and 66. The circuit then checks the status of the filter application contacts 26 and 32 in step 68. If the filter application contacts are open the circuit returns to start. If the contacts are closed, indicative of the placement of the unit on a cartridge (or of a test), a 3 second timer is started (step 70). The 3 second delay (commonly referred to as a de-bounce delay in switching logic) prevents an unintended or incidental contact closure from causing a fill to be falsely sensed.

If the fill sense contacts remain closed (still in contact with the water) at the end of the de-bounce period, a fill up is taking place as illustrated in step 72, and the circuit will then count the number of times that the cartridge has been used and the number of cartridges on which the unit has been applied as will be described with respect to additional program steps.

If the fill sense contacts are open at the end of the de-bounce period, the circuit will return to start unless a set test sequence of pulses (e.g. 7) have been applied to the fill sense contacts (i.e. by shorting the contacts) during the de-bounce period. The number of times the fill sense contacts have been shorted is stored in a fill up sense contact register ("FUSCR") and compared to the preset test sequence in step 74. If the number of pulses is greater or less than the preset number (e.g. 7) the circuit advances to step 78. If the number is equal to the preset test number then the circuit (1) responds as though a fill up was taking place and (2) opens the power latch and returns to start after a predetermined delay (e.g. 10 seconds) via steps 76 and 77 to allow the test operator to verify the proper operation of the unit. The power latch is returned to the off position after the test so that only the portion of the circuit responsive to a shorting of the fill sense contacts is connected to the battery to conserve battery life.

Once a fill up (or a test sequence) is in progress, the circuit is programmed to allow a preset time interval, e.g. 3 minutes, for the fill up operation and prevent a partial refill (causing the fill sense contacts to open and then close) during a fill drain down from counting as an additional fill. As step 78 illustrates, the circuit initially checks the status of the timer and if the timer is not on, following the closure of the fill sense contacts at the end of the de-bounce period, the timer is started via step 80. If the timer is already on the yes output of step 78 returns to start. In addition to starting the 3 minute timer a no response in step 78 causes the circuit to check the status of a used up indicator ("USI") latch via step 82. The USI latch, when on, signifies that the monitoring unit has been used on three expired filters and is no longer operational.

A yes response in step 82 returns the circuit to start without the generation of any filter cartridge status signals. A no response in step 82 is routed to step 84 (or optionally to the steps of FIG. 8 as will be explained) where the fill up number (FUN) counter previously discussed adds the count of 1 to the FUN. If the fill up operation is the first for the filter cartridge, the counter adds one to zero so that as a result of step 84 FUN=1. The second fill up operation will result in FUN=2 at the end of the step 84 etc.

In step 86 the circuit is programmed to subtract one count from the FUN and activate the filter application number (FAN) counter via step 88 to increase its count by one. If the monitoring unit is in use with its first cartridge, then the FAN counter will have a count of 1 at the end of step 86.

In step 90 a preselected filter use number (Y), such as 91, is subtracted from the FUN. When the FUN is less than the preselected number, indicative of the non-imminent occurrence of the end of the useful cartridge life, the integrated circuit, via step 92, energizes the piezo electric transducer to produce a first status level signal e.g. a single pulsed frequency signal of 1 $KH_z$, for example. This first status signal informs the user that the filter is in its operational stage.

If the FUN is within a predetermined range of the end of the useful life of the cartridge e.g. any number between 91 and 100 (or Y+n, where n=any number when added to Y totals less than X), signifying the imminent occurrence thereof, the integrated circuit, via steps 94 and 96, energizes the transducer to produce a second status signal e.g. a single pulsed frequency of 2 KH$_z$. This second status signal informs the user that the filter is in its anticipatory end of life stage i.e., the end of the useful cartridge life is imminent.

When the FUN=X or 101 the circuit energizes the transducer, via step 98, to produce a third status signal informing the user that the filter is in its end of life stage, i.e., the filter useful life has ended. The third status signal may be a combination of the first and second status signals i.e., alternate pulses of 1 and 2 KH$_z$. At this time the circuit interrogates the FAN counter via step 100. If the FAN is less than 3 the circuit continually checks the status of the filter application sense contacts in step 102. Once the contacts are open the FUN counter and the 3 minute timer are reset to zero and the circuit returned to start. If the FAN is equal to 3 the circuit sets the used up indicator, (USI), latch in on condition via step 104 signifying that the life of the monitoring unit has expired, thereby inhibiting the generation of any output signals and any further monitoring operation of the unit.

The count of the number of reservoir or pitcher fill ups (FUN) is the primary determinant of filter life. However, heavy particulate matter may begin to slow the filter rate. This parameter may be included in determining the end of the cartridge's useful life by measuring the flow rate of the cartridge. The additional fill rate sense electrode 30 and the optional program of FIG. 8 when inserted between steps 82 and 84 of FIG. 7 accomplishes this task.

Figure 8:
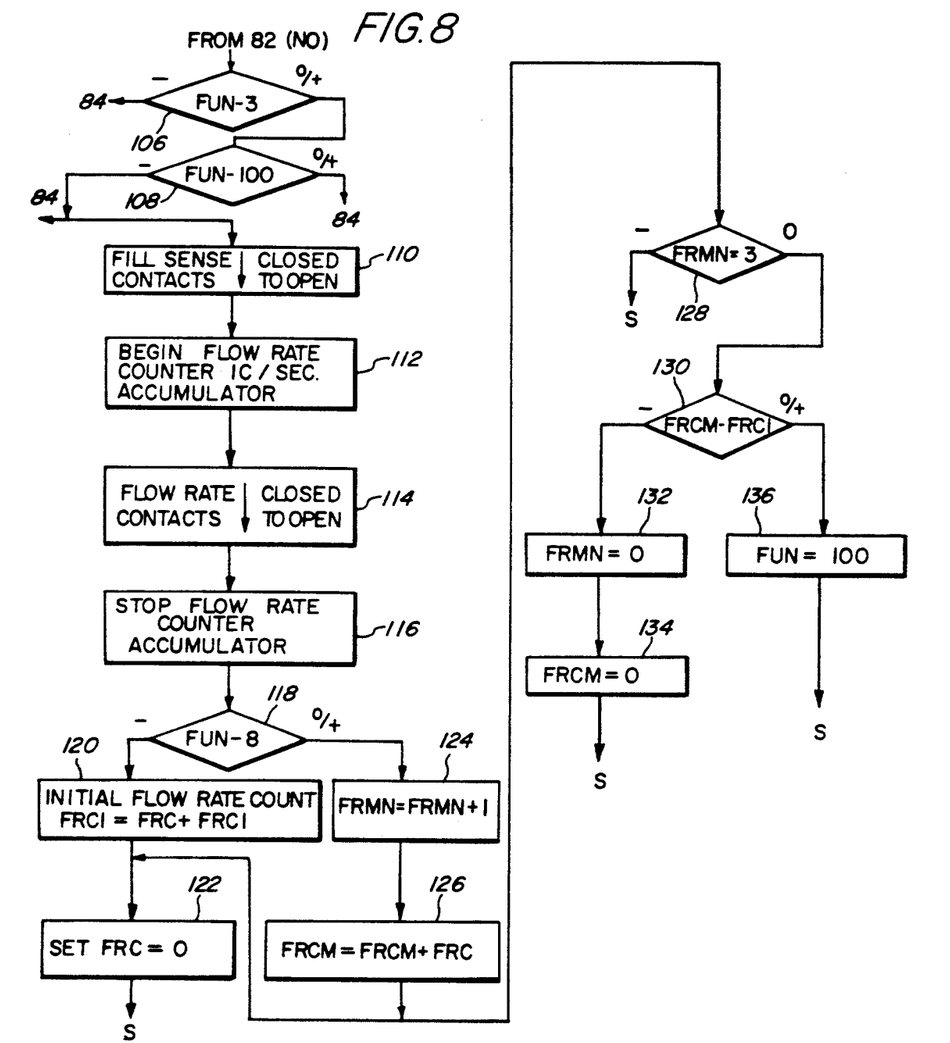
FIG. 8 illustrates, in flow chart form, an optional program which may be executed by the integrated circuit of the monitoring unit.

The fill rate sense electrode is located below (e.g. 0.25") the fill sense electrode 28 and the ground electrode 32. The volume of water contained within the container 10 between the electrodes 28 and 30 is the same for each fill and therefore the flow rate or filtered volume per unit of time may be determined by measuring the time required for the water level to drop from electrode 28 to electrode 30. When the flow rate through the cartridge has degraded a predetermined percentage such as 60% from the initial flow rate the cartridge should be replaced.

The program of FIG. 8 implements this additional parameter by comparing the time required for an initial 5 fill ups with 3 subsequent fill ups. When that time is equal the flow rate has degraded 60% and the circuit is programmed to generate the third status signal during the next fill signifying the need for filter replacement.

The first two fill ups are eliminated from the initial group of five to be used as the control and the circuit is returned to step 84 via step 106 during each of these fill ups.

Step 108 allows the circuit to measure the fill rate for each fill up from number 3 to number 99 by subtracting 100 from the FUN. As long as the FUN is less than 100, the program returns the circuit to step 84 and also causes the circuit to activate a flow rate count ("FRC") accumulator which begins to accumulate the number of pulses, e.g. 1 pulse/sec. from the time that the fill sense contacts (28, 32) transit from a closed to an open condition until the flow rate sense contact 30 and ground contact 32 transit from a closed to an open condition as is illustrated by steps 110-116.

Step 118 routes the flow rate count, FRC, for fill up numbers 3-7 (i.e., 5 fill ups) to a flow rate count initial ("FRCI") register in step 120. In this step the FRC for each individual fill up is added to the previous accumulated flow rate count. For example, assume that the FRC for the number 3 fill up is 20 (e.g. representing 20 seconds), step 120 causes the circuit to add this count to the accumulated previous or initial flow rate count ("FRCI") which is zero. The new FRCI is now 20. The FRC accumulator is then set to zero per step 122. The FRC for the fourth fill up (e.g. 20) is then added in step 120 to the FRCI (i.e. 20) to provide a new FRCI of 40. This process continues until the FRCI represents the total count for the initial 5 fill ups, excluding numbers 1 and 2.

On the eighth fill up, the circuit, via step 118, provides a zero representing the flow rate monitor number ("FRMN") and adds a one thereto via step 124. In step 126 a fill rate count monitor ("FRCM") register adds the FRC pulses for that fill up to the FRC pulses for a previous one or two fills within a group of three. For example, assume that the FRC for fill No. 8 is 25 then the new FRCM at the end of step 126 will equal the FRC of 25 and the previous FRCM of 0. If FRC for fill No. 9 is 30 then the new FRCM at the end of the step No. 126 will equal the FRC of 30 and the previous FRCM of 25 (for fill No. 8) for a total of 55 etc. The FRC accumulator count is set to zero at the end of step 126 as it was at the end of step 120.

Step 128 allows only three fills to be used to arrive at the final FRCM. On the third fill, the circuit through step 130 compares the total flow rate time, FRCM, for the last group of three fills with the flow rate time for the initial five fills, i.e., FRCI. If the FRCM is less then the FRCI and FRMN registers are reset to zero via steps 132 and 134 and the circuit is returned to step 62 to await another fill up operation and the process is repeated. If the FRCM is equal to or greater than the FRCI, signifying a flow rate degradation of 60% or more, the circuit advances the FUN register to 100, via step 136 and the circuit is returned to step 62 to await another fill up operation. On the next fill up operation, step 94 will detect the end of the useful life of the filter and the circuit will generate the third status signal to so notify the user.

It should be noted that a zero or plus response in step 130 may be used to advance the FUN counter to a number less than 100, e.g. 98, so that the circuit will actuate the second status signal notifying the user that the end of the useful life of the filter is imminent. This will allow the user some time to obtain a new filter before a change is called for. Also the filter element degradation benchmarks may be in more than one stage. For example, a decrease in the filter element flow rate of 25% may be used to advance the FUN counter to say 91 with a decrease of 40% advancing the counter to 100.

In addition to degradation as a result of the number of uses a filter element may become impaired due to very infrequent use. An additional counter may be used to measure the elapsed time from the first use (or second use to accommodate a test) and advance the FUN counter to 100 at the end of the preselected time period. It should also be noted that where the filter is disposed within a pressurized system, degradation or effectiveness of the filter may be determined by sensing differential pressure or flow rate.

The electronic components as well as the plastic housing for the monitoring unit, when manufactured in large quantities, are relatively inexpensive thereby providing a cost effective unit. Where a custom integrated circuit is employed it is designed to implement the program set forth in the flow chart. Where a programmable microprocessor is used it may be programmed during the assembly of the unit by conventional techniques. While a single custom integrated circuit chip is considered to be the preferred way to implement the electronics of the monitoring unit several discrete components may be employed, especially for small production runs. For example, a programmable read only memory such as an EEPROM (electrically erasable programmable read-only memory) or other appropriate memories may be used to store the program and provide the operating instructions to a separate microprocessor. The term programmed integrated circuit as used herein shall include both types of implementation of the electronics.

The electronic monitoring unit of this invention serves as a valuable aid to the consumer by producing a highly audible tone burst which apprises the user each time the filter cartridge is used that it is either functioning properly (status signal No. 1), is approaching the end of it useful life (status signal No. 2), the last use is occurring and the filter must be replaced (status signal No. 3) or the useful life has ended (no status signal). The unit also serves as a valuable aid to the manufacturer by assuring consumer confidence and product quality.

Figures 9, 10, 11, 12:
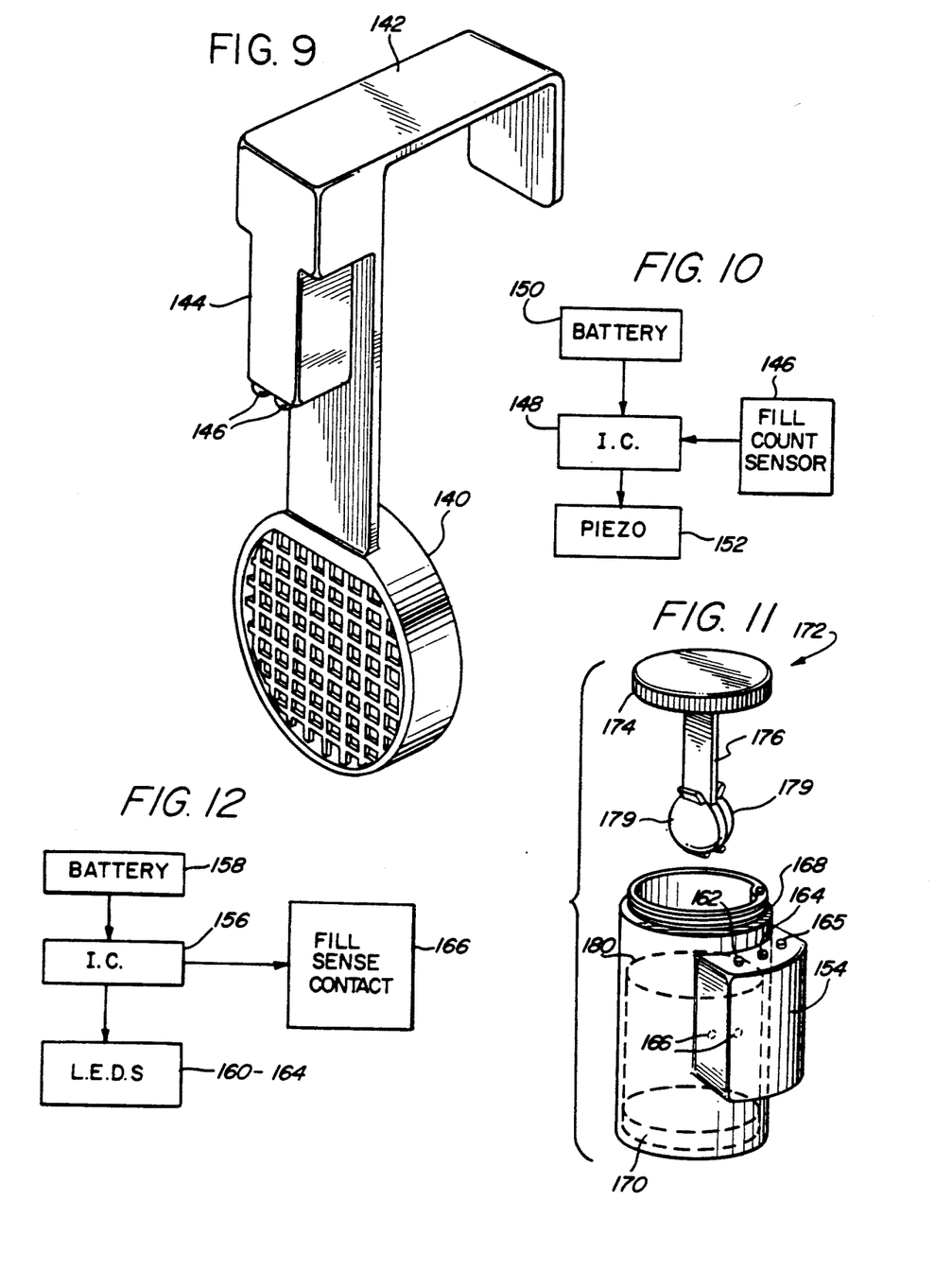
FIG. 9 illustrates, in schematic form, the incorporation of a monitoring unit in accordance with the invention on an automatic toilet bowl cleaning apparatus.
FIG. 10 is a block diagram of the monitoring unit incorporated into the apparatus of FIG. 9.
FIG. 11 illustrates, in schematic form, the incorporation of a monitoring unit in accordance with the invention on contact lens cleaning apparatus.
FIG. 12 is a block diagram of the monitoring unit incorporated into the apparatus of FIG. 11.

Referring now to FIGS. 9 and 10, the electronic monitoring unit of the present invention is illustrated for use with an automated toilet bowl cleaner, the cleaner includes a chemical dispenser 140 disposed at the end of a hanger 142 arranged to fit over the rim of the toilet tank or reservoir so that the dispenser is immersed in the water within the tank between flushes. The dispenser may be arranged to dispense a given quantity of a solid or liquid chemical each time the toilet is flushed. A sealed housing 144 for the electronic components may be suitably secured to the hanger. A pair of contacts 146 extend through the housing 144 and are closed by water contact each time the tank refills after a flush.

A programmed integrated circuit 148, a self contained power source such as battery 150 (e.g. primary cell or rechargeable) and a piezo electric transducer 152 are enclosed within the housing 144. The capacity of the dispenser 140 and the amount of chemical dispensed at each flush determines the useful life of the dispenser. As an example, the dispenser may hold 500 unit doses which constitutes its useful life i.e., X number of flushes. To apprise the user that the end of useful life is approaching an anticipatory end of life warning signal may be provided for say, flushes 480–500.

In operation, the dispenser 140 emits a unit dose of a cleaning and disinfecting powder or viscous liquid into the water within the tank with each flush. During each flushing operation the contacts 146 are opened and closed and the integrated circuit 148 senses this change in the condition of the contacts and accumulates a count for each flush. The accumulated count is compared with a first preselected count Y or 480 constituting the beginning of the anticipatory end of life warning stage. During the operational stage, 1–480 flushes, the integrated circuit may be programmed to actuate the transducer 152 to produce a first status signal, say a 1 KH$_z$ tone burst. When the flush count is 480 to 499 the integrated circuit may be programmed to actuate the transducer to produce a second status signal, say a 3 KH$_z$ tone bust and when the count reaches 500 the transducer may be actuated to produce a third status signal, say alternating 1 and 3 KH$_z$ tone bursts. After the 500th flush, the transducer may be operated by the integrated circuit 148 to produce a fourth signal or no signal at all to inform the user that the dispenser is no longer useful.

The use of the electronic monitoring unit accurately informs the user of the status of the system and eliminates the need for the conventional dye or scent producing reagent to be incorporated into the cleaning chemical (to enable a user to determine when the cleaning product is used up by the disappearance of the dye or scent).

FIGS. 11 and 12 illustrate the use of the electronic monitoring unit with a contact lens cleaning system. A conventional contact lens cleaning system utilizes two chambers or containers. The first chamber contains a cleaning solution such as hydrogen peroxide and/or other cleaning agents. The contacts are immersed for approximately 10 minutes in the first chamber to clean and disinfect the lenses. The lens are then placed in the second chamber and rinsed for several minutes or more in a saline solution containing a catalyst, such as platinum, to decompose any residual peroxide. The catalyst has a finite lifetime and must be replaced.

In FIGS. 11 and 12, there is illustrated the use of the electronic monitoring unit only on the chamber in which the catalyst and saline solution are placed. The lifetime of the catalyst is dependent on the number of uses and therefore the monitoring unit need only monitor the number of uses to inform the user when the catalyst must be changed. In accordance with FIGS. 11 and 12, a housing 154, containing a programmed integrated circuit 156, a battery 158, status signal light emitting diodes 160-164 and fill sense contacts 166 is mounted on a container 168 in which the catalyst 170 in the form of a disc is placed. The fill sense contacts extend through the walls of the container 168 and the housing 154 and are exposed to the liquid within the container at one end and connected to the integrated circuit at the other end. A lens holder 172 includes a cap 174, a downwardly depending leg 17 6 and a pair of lens retainers 178 supported at the bottom of the leg 176.

In operation a pair of lenses are placed in the retainers 179 and immersed in a cleaning solution, such as hydrogen peroxide, contained in a chamber, not shown, for say 10 minutes. The container 168 with a new catalyst disc 170 in place is then filled with a saline solution up to an appropriate level 180. The lenses are then immersed in the saline solution in the container for an appropriate time period to decompose the hydrogen peroxide or other cleaning fluid. The integrated circuit 156 via contacts 166 senses the fill operation and sets a counter to count 1 and actuates LED 162 (e.g. green) to inform the user that the catalyst is effective. This process continues until the count reaches a number representing the imminent end of life for the catalyst, for example, 90. At this time, the circuit 156 actuates LED 164 (e.g. yellow) to inform the operator that the catalyst has entered the imminent end of life stage. The circuit 156 continues to actuate LED 164 during each subsequent use until the last use for which the catalyst is designed is reached, say 100.

During the 100th use, LED 165 (e.g. red) is actuated to inform the operator that the useful life of the catalyst has been reached. The circuit 166 may be programmed to terminate the generation of any output signal beyond the 100th or energize one or more of the LED's to produce a different signal than the ones discussed above to thereby inform the user that the catalyst is no longer effective.

Figure 13:
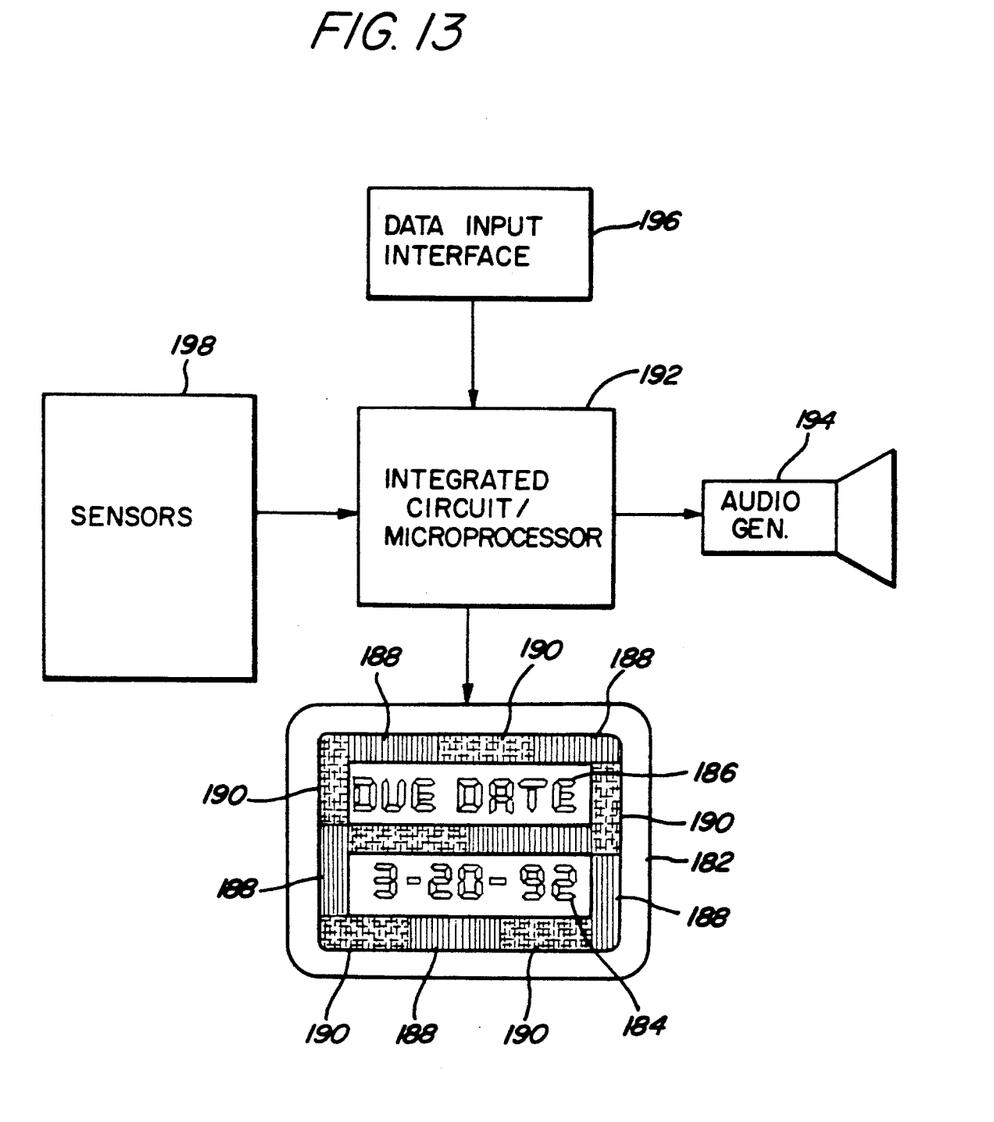
FIG. 13 illustrates, in schematic and block diagram form, a monitoring unit in accordance with the invention which may be used on calibrated testing instruments.

The use of the monitoring unit of the present invention with a calibrated test instrument is illustrated in FIG. 13. The unit includes a housing 182, about the size of a digital wrist watch, adapted to be secured in a conspicuous area, to a calibrated test instrument. The housing includes a liquid crystal display ("LCD") 184 with alphanumeric display fields 186 and 188 on which information such as the calibration due date may be displayed. If desired, additional information such as the name of the person who calibrated the instrument, the serial number thereof etc. may also be displayed during alternate time periods. In addition, the LCD display includes discrete border areas 188 and 190 which may be energized to emit different colors such as yellow (188) and red (190).

An integrated circuit 192 and an audio generator 194 are mounted within the housing 182. A data input interface 196 e.g. contacts, and one or more sensors 198 e.g. temperature, shock etc., may be mounted on the housing for interconnection with the integrated circuit.

The calibration date and/or the due date for the next calibration and if desired other information such as the serial number of the instrument and the name of the person who performed the calibration is inputted in digitally encoded format to the circuit 192 from a computer keyboard input via the interface connection 196. The circuit 192 includes a timer which counts off the remaining time to the calibration due date. The circuit 192 is programmed to operate the LCD to display two line of alphanumeric text as illustrated in FIG. 13 in the fields 184 and 186 on a periodic basis, for example, during 10 second intervals every 60 seconds until the expiration of the calibration due date. Additional information such as the calibrator's name etc. may be displayed alternately with the calibration due date. When the due date is imminent, say within 5 days of the due date, the integrated circuit is programmed to actuate the boarder areas 188 to flash yellow (versus the normal black background) at an appropriate rate of say 12 to 14 pulses per second. In addition, the audio generator 194 may be actuated by the circuit to provide an occasional tone burst during this anticipatory end of useful life stage.

During the last day prior to expiration, the circuit 192 is programmed to actuate the LCD to flash red in the boarder areas 190 at a suitable rate and optionally to actuate the audio generator. Once the calibration has expired, the circuit 192 terminates display of any information or signals and allows the display areas 184 and 186 to go black.

The accuracy of some calibrated instruments can be adversely affected by mechanical and/or thermal shock. The circuit 192 may be additionally programmed to provide anticipatory end of useful life warning signals and/or deactivate the display (end of useful life) in response to sensor signals.

A compact self-contained electronic monitoring unit has been described for accurately monitoring and informing the user of the status of the useful life of devices such as water filters, automated toilet bowl cleaners, contact lens cleaning system, calibrated test instruments and the like. Various modifications of the unit will occur to persons skilled in the art without involving any departure from the spirit and scope of the invention as set forth in the appended claims. For example, there may be a situation in which it is desirable to utilize an external power supply in lieu of a battery disposed within the housing to energize the electronic components.

What is claimed is:

1. In a self contained electronic monitoring unit for monitoring and informing a user of the status of a cartridge designed to be used for a predetermined number of fills of a liquid container, the combination comprising:

signaling means for providing at least first and second distinct human detectable output signals;

use monitoring means for monitoring each use of a cartridge including liquid sensing means for sensing the presence of liquid during each time a container associated is filled with the cartridge and a pre-programmed integrated circuit responsive to the liquid sensing means for recording each use of the cartridge and for monitoring the occurrence, the imminent occurrence and the non-imminent occurrence of a predetermined number of uses, the monitoring means being arranged to provide outputs indicative that the predetermined number of uses has occurred, is imminent and is non-imminent, and for selectively operating the signaling means, the integrated circuit being programmed:

a) to operate the signaling means to provide the first output signal when the output of the use monitoring means is indicative of the non-imminent occurrence of the predetermined number of uses to thereby inform the user that the device is operational and that the end of the useful life thereof is non imminent b) to operate the signaling means to provide the second output signal when the output of the use monitoring means is indicative of the imminent occurrence of the predetermined number of uses to thereby inform the user that the device is operational but that the end of the useful life thereof is imminent; and c) to operate the signaling means to provide neither the first nor the second signal when the output of the use monitoring means is indicative of the occurrence of the predetermined number of uses to thereby inform the user that the useful life of the device has ended.

2. The invention of claim 1 wherein the predetermined number of uses constitutes a first preset number of uses of the cartridge and the imminent occurrence of the predetermined number of uses constitutes a second preset number of uses, the integrated circuit including a counter for recording each use of the cartridge and for providing an output representative of the number of times that the cartridge has been used and wherein the integrated circuit is programmed to operate the signaling means only during each use of the cartridge.

3. The invention of claim 2 wherein the use monitoring means includes a volatile memory for storing the output of the counter and signals representative of the first and second preset numbers.

4. The invention of claim 3 wherein the unit is arranged to be releasably secured to the cartridge and includes a self contained battery for providing power to the integrated circuit and the signaling means and wherein the integrated circuit is further programmed so that one portion thereof is connected to the battery prior to the first use of the cartridge and the remaining portions are connected to the battery upon the occurrence of the first use of the cartridge.

5. The invention of claim 4 wherein the cartridge is a water filter cartridge designed for filtering a given quantity of water during each use.

6. The invention of claim 5 wherein the liquid sensing means includes first and second contacts arranged to be immersed in the liquid being filtered through the cartridge for conducting current therebetween during each time the container is filled.

7. The invention of claim 6 wherein the imminent occurrence of the predetermined number of uses is within the range of 60 to 100% of the total number of uses which constitutes the predetermined number of uses.

8. The invention of claim 7 wherein the imminent occurrence of the predetermined number of uses is within the range of 90 to 100% of the total number of uses which constitute the predetermined number of uses.

9. The invention of claim 7 wherein the integrated circuit is further programmed so that after the occurrence of the predetermined number of uses the signaling means is rendered inoperative for each subsequent use.

10. The invention of claim 7 wherein the signaling means is a transducer for providing an audio output and wherein the unit includes a sealed housing within which the integrated circuit, the transducer and a battery are disposed.

11. The invention of claim 10 wherein the housing is cylindrical in shape and arranged to be secured over the top of the filter cartridge.

12. The invention of claim 11 wherein the use monitoring means includes a third contact and a conducting sleeve which is arrange to short the third contact and one of the first and second contacts when the housing is secured over the top of the filter cartridge.

13. The invention of claim 12 wherein the use monitoring means further includes means for measuring the time required for the filter cartridge to filter the liquid during each use and wherein the integrated circuit is further programmed so that when the filter time for at least one use after a preselected initial number of uses exceeds by a preset value and filter time for at least one of the initial uses, the signaling means is rendered inoperative for each subsequent use.

14. The invention of claim 13 wherein the integrated circuit is programmed so that when the filter time required for five uses exceeds the filter time for three of the initial uses, the signaling means is rendered inoperative for each subsequent use.

15. The invention of claim 14 wherein the means for measuring the time required for the cartridge to filter the water during each use includes a fourth contact positioned below at least one of the first and second electrodes when the housing is in place on the filter cartridge.

16. The invention of claim 1 wherein the cartridge comprises a chamber containing a catalyst for removing cleaning and disinfecting reagents from contact lenses and adapted to receive a quantity of liquid during each cleaning operation and into which contact lenses are immersed.

17. The invention of claim 16 wherein the use monitoring means includes a pair of contacts arranged to be immersed in the liquid within the chamber.

18. The invention of claim 4 wherein the monitoring unit is arranged to monitor the use of at least a second cartridge after the useful life of said first cartridge has ended and second device being designed to be used for said predetermined number of times and wherein the event monitoring means includes a counter and further including means for resetting the counter to provide an output respective only of the number of times that the second device has been used.

19. The invention of claim 1 wherein the liquid container is a reservoir tank for a toilet and the cartridge is an automated toilet bowl cleaner arranged to be suspended in the reservoir tank for the toilet and deliver a cleaning/disinfecting agent into the tank during each time the tank is filled.

20. The invention of claim 19 wherein the use monitoring means includes a pair of contacts arranged to be immersed in the water within the reservoir tank when the tank is full and to be exposed to the atmosphere during the flushing operation.

21. A self-contained electronic monitoring unit adapted to be mounted on a water filter cartridge designed to be used a predetermined number of times for monitoring and informing a user of the status of the filter cartridge, the filter cartridge being adapted to be inserted within the top portion of a portable pitcher and filter water entering the pitcher by gravity flow each time the pitcher is filled comprising:
   means for sensing the flow of water through the filter cartridge;
   signaling means for providing at least first and second distinct human detectable signals; and
   a programmable integrated circuit responsive to the flow sensing means for counting each time the pitcher is filled, for storing counts representative of the end and imminent end of the useful life of the filter cartridge and for selectively operating the signaling means, the integrated circuit being so programmed that:
   (a) when the pitcher is being filled and the number of fill times is indicative of the imminent end of the useful life of the filter cartridge the signaling means is operated to provide the first output signal; and
   (b) when the pitcher is being filled and the number of fill times is indicative of the end of the useful life of the filter cartridge the signaling means is operated to provide the second output signal.

22. The invention of claim 21 wherein the integrated circuit includes a counter for providing an output representative of the number of times that the filter cartridge has been used.

23. The invention of claim 21 wherein the unit is arranged to be releasably secured to the filter cartridge and includes a self contained battery for providing power to the integrated circuit and the signaling means and wherein the integrated circuit is further programmed so that one section thereof is connected to the battery prior to the first use of the filter cartridge and another section is connected to the battery upon the occurrence of the first use of the filter cartridge.

24. The invention of claim 23 wherein the filter cartridge is designed for filtering a given quantity of water during each fill operation.

25. The invention of claim 24 wherein the imminent end of the useful life of the filter cartridge is within the range of 60 to 100% of the total number of fills which constitute the designed end of the useful life.

26. The invention of claim 25 wherein the imminent end of the useful life of the filter cartridge is within the range of 90 to 100% of the total number of fills which constitute the designed end of the useful life.

27. The invention of claim 25 wherein the integrated circuit is further programmed so that after the end of the useful life for said one cartridge has occurred the signaling means is rendered inoperative for each subsequent fill operation.

28. The invention of claim 27 wherein the integrated circuit is further arranged to store a count indicative that the end of the useful life of the filter cartridge is not imminent, the signaling means being arranged to provide a third distinct human detectable signal and the integrated circuit being so programmed that when the pitcher is being filled and the total member of fill operations is indicative that the end of the useful life is not imminent the signaling means is operated to provide the third output signal.

29. The invention of claim 28 wherein the integrated circuit is programmed so that when the filter time required for five fill operations exceeds the filter time for three of the initial fill operations, the signaling means is rendered inoperative for each subsequent fill operation.

30. The invention of claim 27 further including means for measuring the time required for the cartridge to filter the water during each fill operation and wherein the integrated circuit is further programmed so that when the filter time for at least one fill operation after a preselected initial number of fill operations exceeds by a preset value the filter time for at least one of the initial fill operations, the signaling means is rendered inoperative for each subsequent use.

* * * * *

UNITED STATES PATENT AND TRADEMARK OFFICE
CERTIFICATE OF CORRECTION

PATENT NO. : 5,328,597

DATED : July 12, 1994

INVENTOR(S) : Norton K. Boldt, Jr. and Kaj A. Johnson

It is certified that error appears in the above-identified patent and that said Letters Patent is hereby corrected as shown below:

Abstract, line 4, after "includes" insert --a--.

Column 12, line 11, after "associated" delete the words "is filled" and after the word "cartridge" insert --is filled--.

Column 12, line 28, "non" should read --not--.

Column 13, line 62, delete "4" and insert --21--.

Column 13, line 65, delete "and" and insert --said--.

Column 15, line 13, delete "28" and insert --27--.

Column 16, line 4, delete "27" and insert --28--.

Signed and Sealed this

Twenty-seventh Day of December, 1994

Attest:

BRUCE LEHMAN

Attesting Officer

Commissioner of Patents and Trademarks